Feb. 18, 1941.  F. CANFIELD  2,232,094
SUPPORTING HOOK
Filed March 19, 1940
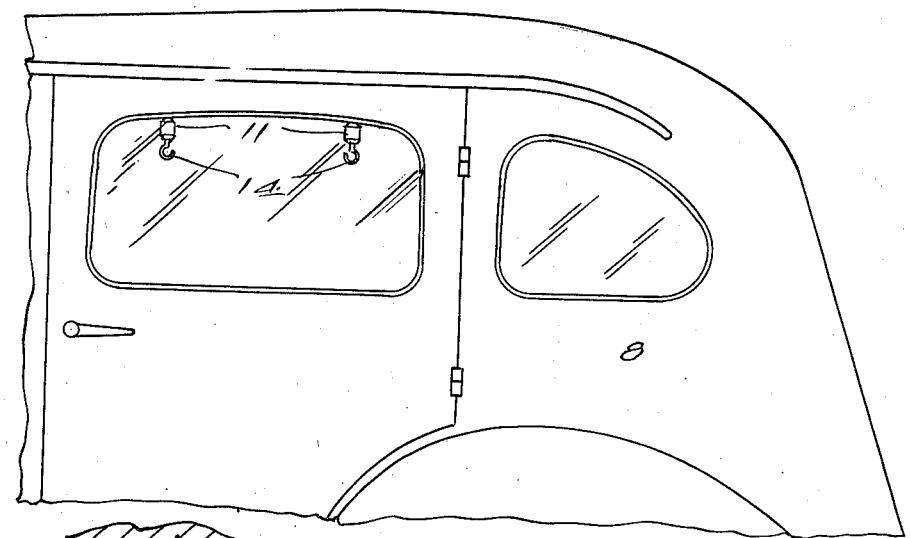
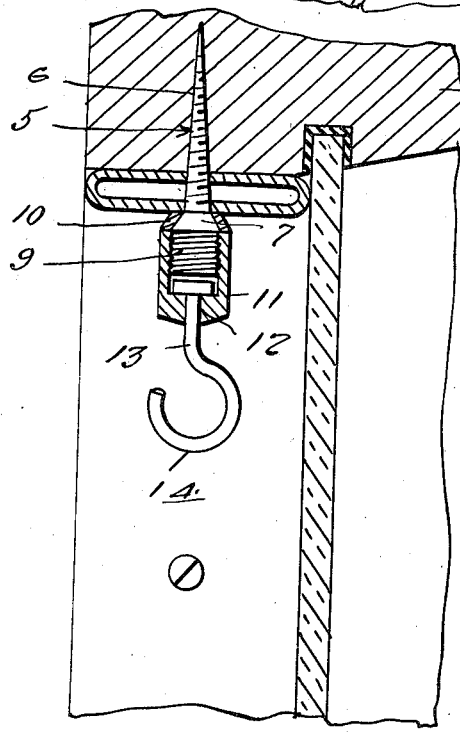
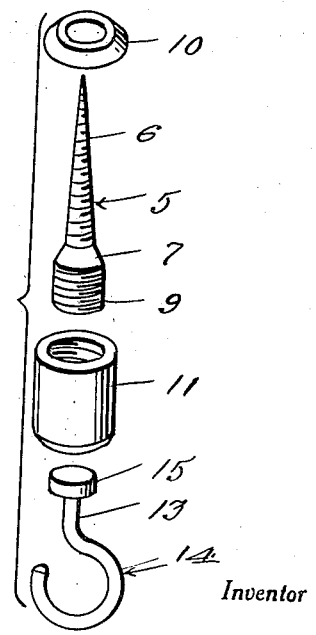
Inventor
Floyd Canfield
By Clarence A. O'Brien
Attorney Patented Feb. 18, 1941

2,232,094

UNITED STATES PATENT OFFICE 2,232,094

SUPPORTING HOOK

Floyd Canfield, Thief River Falls, Minn.

Application March 19, 1940, Serial No. 324,871

1 Claim. (Cl. 248—339)

This invention relates to a supporting hook on which various types of articles may be supported, and has for the primary object the provision of a device of this character which may have a wide range of utility in various arts and is especially useful for the support of articles such as wearing apparel in motor vehicles and other kinds of conveyances, the construction being such that the device may be firmly secured into various kinds of materials and the suspension hook thereof be free to rotate so that it will permit an article to be easily and quickly placed thereon or removed therefrom when desired.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a portion of a motor vehicle body equipped with the present invention.

Figure 2 is a fragmentary sectional view illustrating the present invention applied to a portion of the motor vehicle body.

Figure 3 is an exploded perspective view illustrating the various parts of the invention.

Referring in detail to the drawing, the numeral 5 indicates a screw including a screw threaded shank 6 and a head 7. The shank 6 permits threading of the screw 5 into various materials or into the body of a vehicle as indicated generally by the character 8. The head 7 of the screw includes the usual beveled portion with an externally screw threaded portion 9, the end of which may have a screw driver kerf or slot if desired. A cup-shaped finishing washer 10 is positioned on the screw to receive therein the beveled face of the head and forms a seat for one end of a sleeve 11. The sleeve 11 is internally screw threaded to receive the externally screw threaded portion 9 of the head 7 of the screw. One end of the sleeve is closed by an end wall 12 except for an opening therethrough which permits the stem 13 of a hook 14 to extend into the sleeve. The free end of the stem 13 has connected thereto a disc-like member 15 which seats against the inner face of the end wall 12 of the sleeve 11 preventing the stem from drawing out of the sleeve when the device is in use but which will permit the hook 14 to readily rotate with relation to the sleeve or screw. The hook 14 being rotatably mounted as specified, will permit the hook to be easily adjusted for the purpose of placing thereon different kinds of articles such as wearing apparel and the like and to remove the articles with ease when desired.

The screw 5 being of the construction specified, will permit the device to be firmly secured in place, as clearly shown in Figure 2, without any danger of the hook becoming accidentally displaced. Also, at any time when it is desired to remove the hook it is only necessary to unthread the sleeve 11 from the head 7 of the screw.

It is to be understood that the head 15 may be secured onto the stem 13 in any well known manner so as to permit the assembling of the hook in the sleeve.

It is believed that the simplicity and advantages of this invention will be perfectly apparent to those skilled in the art to which such a device relates, and while I have herein set forth a satisfactory embodiment of the invention, it is to be understood that such changes therefrom as fairly fall within the scope of my claim may be resorted to when desired.

Having described my invention, what I claim is:

A garment supporting hook for an upholstered part of a vehicle comprising a screw having a pointed and threaded shank for threading into a part of the vehicle and through the upholstery covering such part, a cylindrical screw-threaded head and a beveled portion connecting the head with the large end of the shank, a sleeve having one end closed, said sleeve having a portion of its interior screw-threaded to engage the threads of the head with the threads of the sleeve terminating short of the closed end thereof, a cup-shaped washer fitting on the beveled portion and having its inner end engaging the upholstery and its outer end the inner end of the sleeve, said sleeve having a centrally arranged opening in its closed end and a suspension hook having a shank passing through the opening with a head on its inner end fitting in the space in the sleeve between the head of the screw and the closed end of the sleeve.

FLOYD CANFIELD.